Oct. 30, 1934.    A. ROSNER    1,978,723
BRAKE
Filed Sept. 17, 1931    2 Sheets-Sheet 1

INVENTOR.
ADOLPH ROSNER
BY
ATTORNEY

Oct. 30, 1934.  A. ROSNER  1,978,723
BRAKE
Filed Sept. 17, 1931    2 Sheets-Sheet 2

INVENTOR.
ADOLPH ROSNER
BY
ATTORNEY

Patented Oct. 30, 1934

1,978,723

UNITED STATES PATENT OFFICE 1,978,723

BRAKE

Adolph Rosner, Rockton, Ill., assignor to Bendix Aviation Corporation, South Bend, Ind., a corporation of Illinois Application September 17, 1931, Serial No. 563,253

14 Claims. (Cl. 188—78)

This invention relates to brakes and more particularly to internal expanding brakes.

Broadly, the invention comprehends a simplified brake structure having many advantages over brakes of the same general type.

In the illustrated embodiment of the invention the structure includes a fixed member, a rotatable drum associated therewith, a friction element supported by the fixed member, an applying member carried by the friction element and means for adjusting the friction element to compensate for wear.

Because of the particular structure and arrangement of the essential parts, the number of parts in the structure is reduced to the minimum and yet the efficiency of the brake is not impaired.

An object of the invention is to provide a brake structure including a rotatable drum, a friction element associated therewith, and means for applying the friction element including an operating member suspended by the friction element.

Another object of the invention is to provide a brake structure including a fixed member and a friction element supported thereby having portions removed to form in effect a toggle and an operating lever depending from the knee of the toggle.

Another object of the invention is to provide a brake structure including a friction element having separable ends and portions removed to form in effect a toggle at the separable ends and an operating lever for the friction element supported between the separable ends and having its force applying end engaging the friction element at a point removed from the separable ends.

A further object of the invention is to provide a brake structure including a fixed member having lugs arranged in spaced relation on its perimeter and a friction element having longitudinal slots for the receipt of the lugs and cutaway portions on the friction elements forming in effect a toggle and an applying lever depending from the knee of the toggle having its force applying and engaging the back of the friction element.

A feature of the invention is a friction element including a band having portions removed to form in effect a toggle.

Another feature of the invention is a friction element having flanges with portions removed to form in effect a toggle.

Another feature of the invention is a friction element including a ring having longitudinal slots and separable ends.

Another feature of the invention is a fixed member having spaced peripheral lugs and a friction element including a split ring having longitudinal slots receiving the peripheral lugs.

Another feature of the invention is an applying lever including a curved body portion having an arm positioned substantially centrally between the ends.

Another feature of the invention is an operating lever having a curved body portion with an integral arm extending radially from the body portion centrally between the ends.

A further feature of the invention is an operating member having a curved body portion with radial end portions and a fulcrumed portion extending radially from the body portion between the end portion.

An additional object is to provide a brake which is simple and inexpensive in structure, higher efficiency in use, positive in action, durable in service and a general improvement in the art.

Other objects and features of the invention will appear from the following description taken in connection with the drawings forming a part of this specification, and in which.

Figure 1:
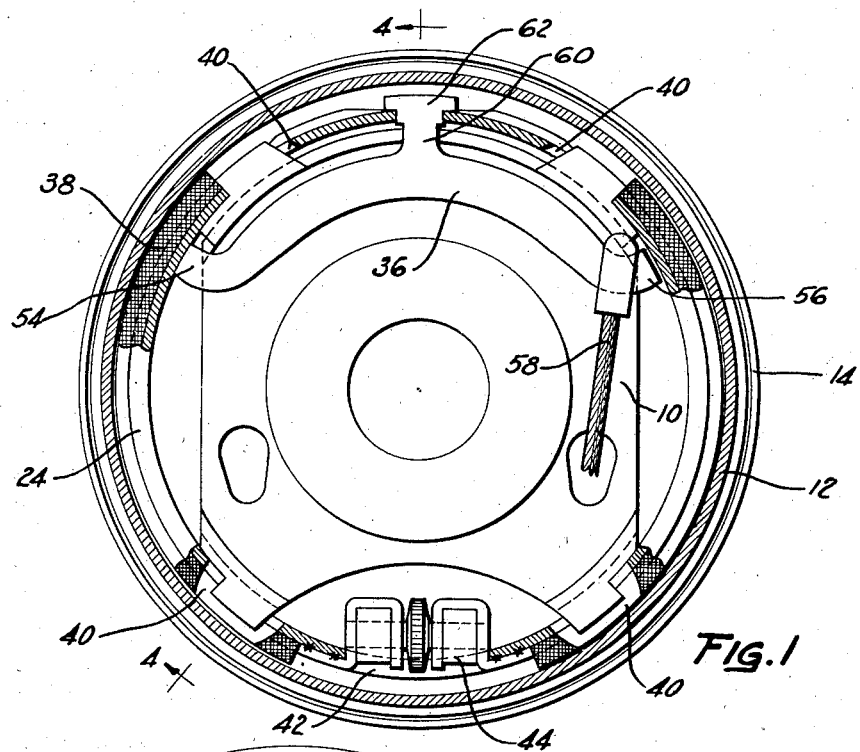
Figure 1 is a vertical sectional view of a brake taken just back of the head of the drum illustrating the friction elements in side elevation.
Figure 2:
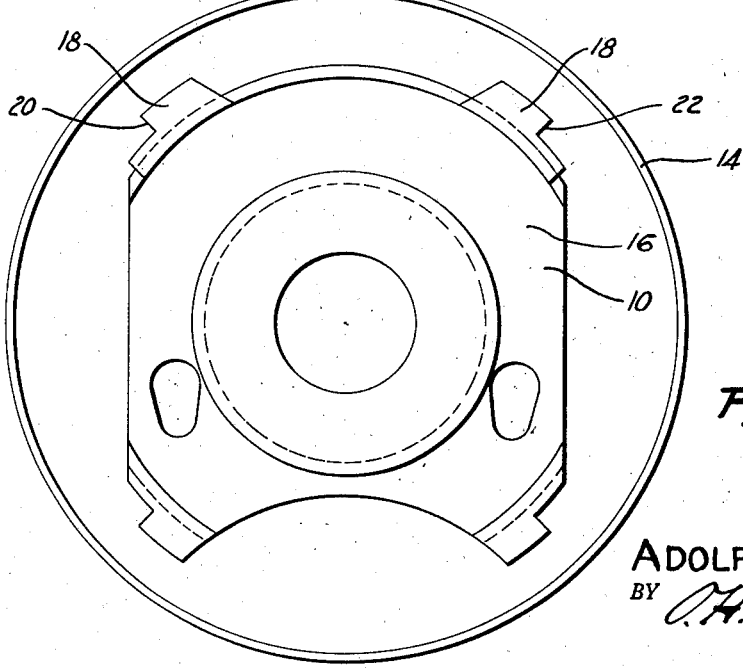
Figure 2 is a plan view of the backing plate and dust shield assembly.
Figure 3:
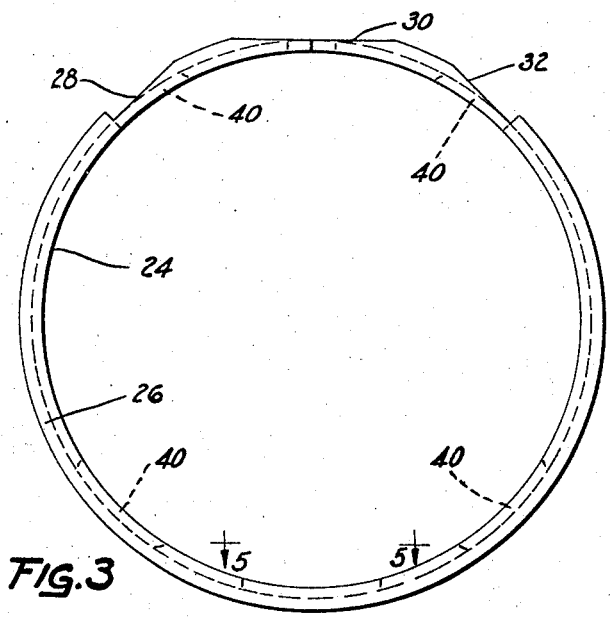
Figure 3 is a side elevation of the friction element.
Figure 5:
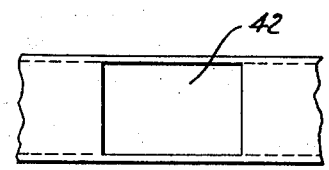
Figure 5 is a fragmentary view of the friction element substantially on line 5—5, Figure 3.
Figure 6:
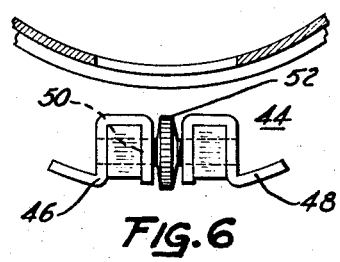
Figure 6 illustrates the adjusting member.
Figure 4:
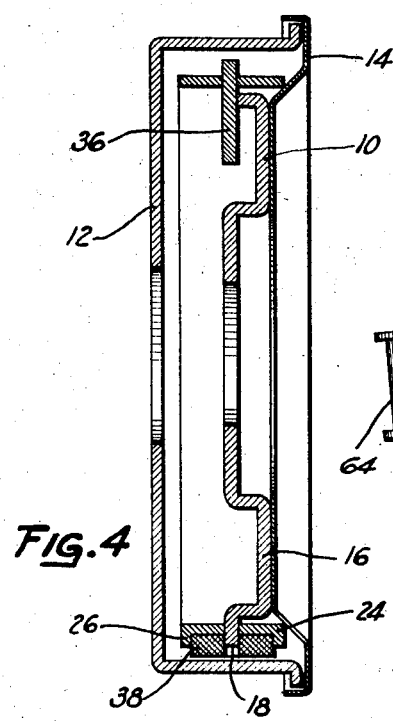
Figure 4 is a vertical sectional view substantially on line 4—4, Figure 1.
Figure 7:
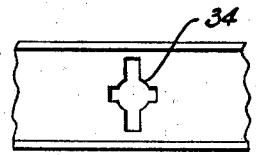
Figure 7 is a fragmentary view of the friction element illustrating means for attaching the operating lever.

Referring to the drawings for more specific details of the invention, 10 represents a fixed support which may be secured to a knuckle or an axle. Associated with the fixed support is a rotatable drum which may be secured to a wheel, not shown. The fixed support 10 has suitably secured thereto a dust shield 14 cooperating with the drum to house the brake structure.

As shown, the fixed support comprises a plate having an offset portion 16 and spaced peripheral lugs 18 which are shouldered as indicated at 20 and 22, to provide suitable anchors for a friction element 24.

The friction element comprises a ring or band 110 having strengthening webs 26 cut away as indicated at 28, 30 and 32 providing in effect a toggle the knee of which is slotted as indicated at 34 for the reception of an operating lever 36 to be hereinafter described. The friction element is further provided with a friction lining 38 adaptable for cooperating with the drum. As shown, the friction element has a plurality of longitudinal slots 40 arranged in spaced relation centrally with respect to the width of the band. These slots receive the lugs 18 and cooperate with the shoulders 20 and 22 for anchoring the friction element. In the manufacture of this element the ring 24 is rolled from steel stock to form a split ring from which the flanges are cut away as at 28, 30 and 32 and the ring has cut therefrom a rectangular opening indicated at 42 straddling the split in the ring. An adjusting device indicated generally at 44 is fitted into the opening and suitably secured to the respective separable ends of the friction element.

As shown, this adjusting device includes two U-shaped members 46 and 48 tapped to receive a right or left hand threaded adjusting screw 50 having thereon a disk or wheel 52 for manipulating the screw. The operating member 36 includes a lever having an arcuate body portion with radial ends 54 and 56. The end 54 is adapted to engage the back of the friction element and the end 56 provides a suitable connection for a tension member 58 connecting the lever to a suitable source of power, not shown. Formed integral with the lever intermediate its end is an arm 60 having a head 62 which is received by the slot 34 and supported by that portion of the friction element immediately surrounding the slot 34.

Figure 8:
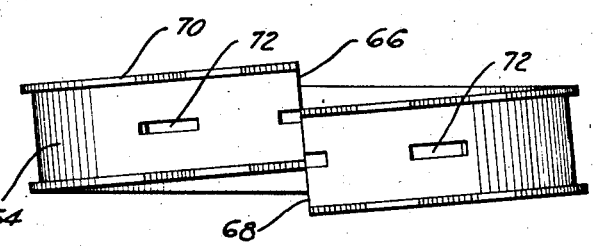
Figure 8 is a modification of the friction element.

A modification of the invention is illustrated in Figure 8 wherein the friction element comprises a split band 64 sprung to offset its opposite ends as indicated at 66 and 68. This band also has stiffening webs 70 cut away as shown in the preferred form of the invention providing in effect a toggle. The band is also provided with longitudinal slots 72 arranged in spaced relation substantially centrally with respect to the width of the band for the reception of the lugs 18 formed on the perimeter of the fixed member. In this structure the band is sprung on the lugs 18 so that lateral movement of the band with respect to the lugs is avoided.

In operation, force is applied to the lever 36 through the tension member 58 and upon force being applied to the lever, the initial pressure is applied to the friction element which moves this element against the anchor 20 or 22 according to the direction of drum rotation without any click whatsoever and upon application of additional force the band is moved into drum engagement through the toggle formed by the cutaway portions to effectively apply the brake.

While the preferred embodiments of the invention have been described it is to be understood that these are given merely as examples of the underlying principles of the invention, and since these may be incorporated in other specific mechanical structures, I do not intend to be limited to those shown except as such limitations are clearly imposed by the appended claims. The above-described adjusting device is claimed in my divisional application No. 700,502, filed December 1, 1933.

Having thus described the various features of the invention, what I desire to secure by Letters Patent is:

1. A brake comprising an operating lever having an arcuate body portion, radial end portions and a substantially central radial fulcrumed portion, said end portions and said fulcrumed portion all being formed as projections extending radially outward of the brake.

2. A brake comprising a friction element having portions removed therefrom to form in effect a toggle, an operating member for the friction element depending from the knee of the toggle and having its force applying end engaging the back of the friction element.

3. A brake comprising a friction element including a ring having portions removed to form in effect a toggle, an operating member for the friction element depending from the knee of the toggle and arranged for engagement with the back of the friction element.

4. A brake comprising a friction element having portions removed to form in effect a toggle having a slot in its knee, a force applying lever having an arm extending through a slot and a head on the arm supported by the wall surrounding the slot.

5. A brake comprising a friction element having portions removed to form in effect a toggle having a slot in the knee thereof, an operating lever supported by the knee of the toggle having one end engaging the back of the lever and its other end connected to a tension member.

6. A brake comprising a friction element having portions removed to form in effect a toggle, an operating lever having a curved body portion and radial end portions and a radial fulcrumed portion intermediate the end portions connected to the knee of the toggle.

7. A brake comprising a fixed member having peripheral lugs, a rotatable drum associated therewith, a friction element supported on the lugs having portions removed therefrom to form in effect a toggle, an operating lever for the friction element suspended from the knee of the toggle.

8. A brake comprising a fixed member having peripheral lugs, a rotatable drum associated therewith, a friction element positioned on the lugs having portions removed therefrom to form in effect a toggle, an operating lever suspended from the knee of the toggle and radial ends on the lever, one of which engages the back of the friction element and the other receiving the force applying element.

9. A brake comprising a friction element including a split ring having its ends sprung laterally in opposite directions.

10. A brake comprising a fixed member having peripheral lugs, a friction element including a split ring having its ends sprung in opposite directions and its body portion slotted to receive the lugs.

11. A brake comprising a fixed support having peripheral lugs arranged in spaced relation and a friction element including a split band having its ends sprung in opposite directions and its body portion slotted centrally wth respect to the width of the band for the reception of the lugs.

12. A brake comprising a fixed support having peripheral lugs arranged in spaced relation, shoulders on the lugs, a friction element including a split band having its ends sprung in opposite directions and spaced slots positioned centrally with respect to the width of the band for the reception of the lugs, and means for applying the friction element including means for imposing force on the ends of the band.

13. A brake comprising a fixed support, a rotatable drum associated therewith, a friction element including a split ring having separable ends sprung in opposite directions with portions removed therefrom to form in effect a toggle and longitudinal slots arranged in spaced relation and centrally with respect to the width of the band, peripheral lugs on the support extending into the slots, and an operating lever suspended from the knee of the toggle.

14. A brake comprising a fixed support, a drum associated therewith, a friction element including a split band having reinforcing webs cutaway to provide in effect a toggle and longitudinal slots arranged in spaced relation and centrally with respect to the width of the band, a friction lining on the face of the band between the strengthening webs, lugs on the periphery of the support, and means for applying friction element to the drum including a lever fulcrumed on the knee of the toggle and having its force applying end engaging the back of the friction element.

ADOLPH ROSNER.